(12) United States Patent
Chmiel et al.

(10) Patent No.: US 9,105,134 B2
(45) Date of Patent: Aug. 11, 2015

(54) TECHNIQUES FOR VISUALIZING THE AGE OF DATA IN AN ANALYTICS REPORT (75) Inventors: Matthew S. Chmiel, Ottawa (CA); Jason Hiltz-Laforge, Ottawa (CA); Alireza Pourshahid, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1114 days.

(21) Appl. No.: 13/114,930

(22) Filed: May 24, 2011

(65) Prior Publication Data

US 2012/0304110 A1 Nov. 29, 2012

(51) Int. Cl.
*G06F 3/048* (2013.01)
*G06T 11/20* (2006.01)
*G06F 3/0481* (2013.01)
*G06Q 10/06* (2012.01)

(52) U.S. Cl.
CPC ............ *G06T 11/206* (2013.01); *G06F 3/0481* (2013.01); *G06Q 10/06* (2013.01); *G06Q 10/067* (2013.01); *G06Q 10/0639* (2013.01)

(58) Field of Classification Search
CPC .......... G06T 15/08; G06T 19/00; G06T 15/00
USPC ....................................................... 345/419
See application file for complete search history.

(56) References Cited

U.S. PATENT DOCUMENTS

| | | | |
|---|---|---|---|
| 7,089,506 B2 * | 8/2006 | Gantenhammer et al. ..... | 715/850 |
| 7,774,695 B2 * | 8/2010 | Kobylinski ................... | 715/227 |
| 8,131,618 B2 * | 3/2012 | Weinstein ........................ | 705/35 |
| 2002/0044152 A1 | 4/2002 | Abbott et al. | |
| 2002/0118230 A1 * | 8/2002 | Card et al. ..................... | 345/776 |
| 2004/0113915 A1 * | 6/2004 | Ohtsuki et al. ................ | 345/582 |
| 2004/0138933 A1 | 7/2004 | LaComb et al. | |
| 2005/0273408 A1 * | 12/2005 | Bandman et al. ............... | 705/35 |
| 2006/0089939 A1 | 4/2006 | Broda et al. | |
| 2007/0010970 A1 * | 1/2007 | Bramwell et al. ............ | 702/183 |
| 2008/0195930 A1 | 8/2008 | Tolle | |
| 2008/0208910 A1 | 8/2008 | MacIntyre et al. | |
| 2009/0119309 A1 * | 5/2009 | Gibson et al. ................. | 707/100 |
| 2009/0125530 A1 | 5/2009 | Martinsson et al. | |
| 2010/0185984 A1 | 7/2010 | Wright et al. | |
| 2010/0325206 A1 | 12/2010 | Dayal et al. | |
| 2012/0240064 A1 | 9/2012 | Ramsay et al. | |

(Continued)

OTHER PUBLICATIONS

GeoMapApp Help, Oct. 13, 2008, Marine Geoscience Data System, p. 1-5.*

(Continued)

*Primary Examiner* — Boris Pesin
*Assistant Examiner* — Justin Lee
(74) *Attorney, Agent, or Firm* — Shumaker & Sieffert, P.A.

(57) ABSTRACT

In one embodiment, a method includes displaying, in two dimensions, a business analytics report containing various data elements, wherein each data element has data associated therewith. The method further enables generation of a three-dimensional representation of the business analytics report by adding a time axis to the data elements. Once the three-dimensional representation is generated, the method displays, on the time axis, update points identifying when data associated with the data elements was updated. In some cases, depending on the length of the time axis, several update points may be displayed for each data element. A corresponding computer program product and apparatus are also described.

17 Claims, 8 Drawing Sheets

(56) References Cited

U.S. PATENT DOCUMENTS

2014/0115541 A1* 4/2014 Mandel et al. ............... 715/836
2014/0122467 A1* 5/2014 Mandel et al. ............... 707/723

OTHER PUBLICATIONS

Preve, Jordan, "Business Intelligence for Financial Risk Management," Worcester Polytechnic Institute, Apr. 2009.

Chung, et al., "Business Intelligence Explorer: A Knowledge Map Framework for Discovering Business Intelligence on the Web," Proceedings of the 36th Annual Hawaii International Conference on System Sciences, p. 10, Feb. 2003.

Beaulieu, et al., "Interactive Exploration of Multi-granularity Spatial and Temporal Datacubes: Providing Computer-Assisted Geovisualization Support," Laval University, Centre for Research in Geomatics, 2008.

Rivest, et al., "SOLAP Technology: Merging Business Intelligence With Geospatial Technology for Interactive Spatio-Temporal Exploration and Analysis of Data," International Society for Photogrammetry and Remote Sensing, Nov. 2005.

* cited by examiner

| EN-ORDERMETHOD | QUANTITY | RETURNQUANTITY |
|---|---|---|
| E-mail | 7,046 | 2,548 |
| Fax | 1,972 | 656 |
| Mail | 1,452 | 542 |
| Sales Visit | 10,032 | 3,652 |
| Special | 1,024 | 426 |
| Telephone | 10,490 | 3,694 |
| Web | 7,904 | 2,788 |
| OVERALL - SUMMARY | 39,920 | 14,306 |

Simple List Report

| EN-ORDERMETHOD | QUANTITY | RETURNQUANTITY |
|---|---|---|
| E-mail | 5,249 | 1,892 |
| Fax | 1,972 | 459 |
| Mail | 897 | 542 |
| Sales Visit | 9,931 | 3,141 |
| Special | 1,024 | 426 |
| Telephone | 9,261 | 3,694 |
| Web | 7,904 | 1,843 |
| OVERALL - SUMMARY | 39,920 | 14,306 |
| Jan. 7, 2010 | | 10:31:56 AM |

Simple List Report

Fig. 8

TECHNIQUES FOR VISUALIZING THE AGE OF DATA IN AN ANALYTICS REPORT

TECHNICAL FIELD

This disclosure relates to computing devices, and more particularly to apparatus and methods for using one or more computing devices to visualize data in analytics reports.

BACKGROUND

In today's ultra-competitive market environment, it may be important for enterprises to effectively utilize their business data not only to keep pace with competitors, but also to acquire a competitive advantage. The field of "business analytics" is directed to helping enterprises more effectively utilize their business data. "Business analytics" refers to the analysis and organization of historical data and the delivery of meaningful business information in convenient forms, such as dynamic interactive reports.

BRIEF SUMMARY

In one embodiment, a method for providing a visualization an age of data in a business analytics report includes displaying, in two dimensions, a business analytics report containing various data elements, wherein each data element has data associated therewith. The method further includes enabling generation of a three-dimensional representation of the business analytics report by adding a time axis to the data elements of the business analytics report. The method further includes displaying, on the time axis, update points identifying when data associated with the data elements of the business analytics report was updated.

In one embodiment, a computer program product to provide a visualization of an age of data in a business analytics report includes a computer-readable storage medium having computer-readable program code embodied therein. The computer-readable program code includes computer-readable program code to display, in two dimensions, a business analytics report comprising a plurality of data elements having data associated therewith, and computer-readable program code to enable generation of a three-dimensional representation of the business analytics report by adding a time axis to the data elements of the business analytics report. The computer-readable program code further includes computer-readable program code to display, on the time axis, update points identifying when the data associated with the data elements of the business analytics report was updated.

In one embodiment, an apparatus to provide a visualization of an age of data in a business analytics report includes a two-dimensional view module to display, in two dimensions, a business analytics report comprising a plurality of data elements having data associated therewith, a module to generate a three-dimensional representation of the business analytics report by adding a time axis to the data elements of the business analytics report, and a three-dimensional view module to display, on the time axis, update points identifying when the data associated with the data elements of the business analytics report was updated.

BRIEF DESCRIPTION OF THE SEVERAL VIEWS OF THE DRAWINGS

A more particular description of the disclosure briefly described above will be rendered by reference to specific embodiments illustrated in the appended drawings. Understanding that these drawings depict only typical embodiments of the disclosure and are not therefore to be considered limiting of its scope, the disclosure will be described and explained with additional specificity and detail through use of the accompanying drawings, in which.

DETAILED DESCRIPTION

It will be readily understood that the components of the present disclosure, as generally described and illustrated in the Figures herein, could be arranged and designed in a wide variety of different configurations. Thus, the following more detailed description of the embodiments of the disclosure, as represented in the Figures, is not intended to limit the scope of the disclosure, as claimed, but is merely representative of certain examples of presently contemplated embodiments in accordance with the disclosure. The presently described embodiments will be best understood by reference to the drawings, wherein like parts are designated by like numerals throughout.

As will be appreciated by one skilled in the art, the present disclosure may be embodied as an apparatus, system, method, or computer program product. Furthermore, the present disclosure may take the form of a hardware embodiment, a software embodiment (including firmware, resident software, microcode, etc.) configured to operate hardware, or an embodiment combining software and hardware aspects that may all generally be referred to herein as a "module" or "apparatus." Furthermore, the present disclosure may take the form of a computer-readable storage medium embodied in any tangible medium of expression having computer-readable program code stored therein.

Any combination of one or more computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-readable storage medium may be any medium that can contain and/or store the program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in any combination of one or more programming languages, including an object-oriented programming language such as Java, Smalltalk, C++, or the like, conventional procedural programming languages, such as the "C" programming language or similar programming languages, or scripting languages, such as JavaScript or JavaScript combined with HTML. Computer program code for implementing the disclosure may also be written in a low-level programming language such as assembly language.

The present disclosure may be described below with reference to flowchart illustrations and/or block diagrams of methods, apparatus, systems, and computer program products according to various embodiments of the disclosure. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational acts to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, acts, operations, elements, and/or components, but do not preclude the presence or addition of one or more other features, integers, acts, operations, elements, components, and/or groups thereof As noted earlier, interactive analytics reports may provide high-level summaries of business performance while also allowing business analysts to drill down to lower levels of detail to gain additional insight. Such reports make it easier to visualize and analyze past performance in order to plan future business activities.

Although business analytics reports can improve decision making, their usefulness may only be as good as the data on which they rely. Often the data that is displayed in a report is not current, as the report, or the underlying data source, is cached or updated at preset intervals. Even if the data source on which the report relies has been updated, much of the data within the data source may not be up-to-date. This may be problematic for the user, who may interpret the data in the report as if it is current.

Often, generating a report creates a timestamp, which may be displayed on the report. This timestamp provides at least some context to the user regarding the age of the report. Such timestamps may be misleading, however, since, even through the reports may be new, all or part of the data in the reports may be old. This can mislead a user into thinking that he or she is working with the latest data, when in fact he or she is working with older data. This can have a potentially detrimental impact on business decision-making.

One way to provide desired context for data is to provide a text-based timestamp for each cell in a report to indicate when the underlying data was updated. Such a timestamp may be placed on each cell of the report (although this may undesirably add clutter to the report). Alternatively, the timestamp could be accessed through a separate information display, allowing a user to check each cell of interest to get a feel for the age of data in the report. Text-based timestamps, however, are difficult for a user to process quickly, making it an onerous job to create a mental picture of the update times for each cell in the report.

In view of the foregoing, apparatuses and methods may be provided to enable more efficient visualization of the age of data in business analytics reports. The age of the data may be presented in such a way that it can be quickly processed by users. Apparatuses and methods may also be provided to enable modification of business analytics reports using data from different points in time.

Figure 1:
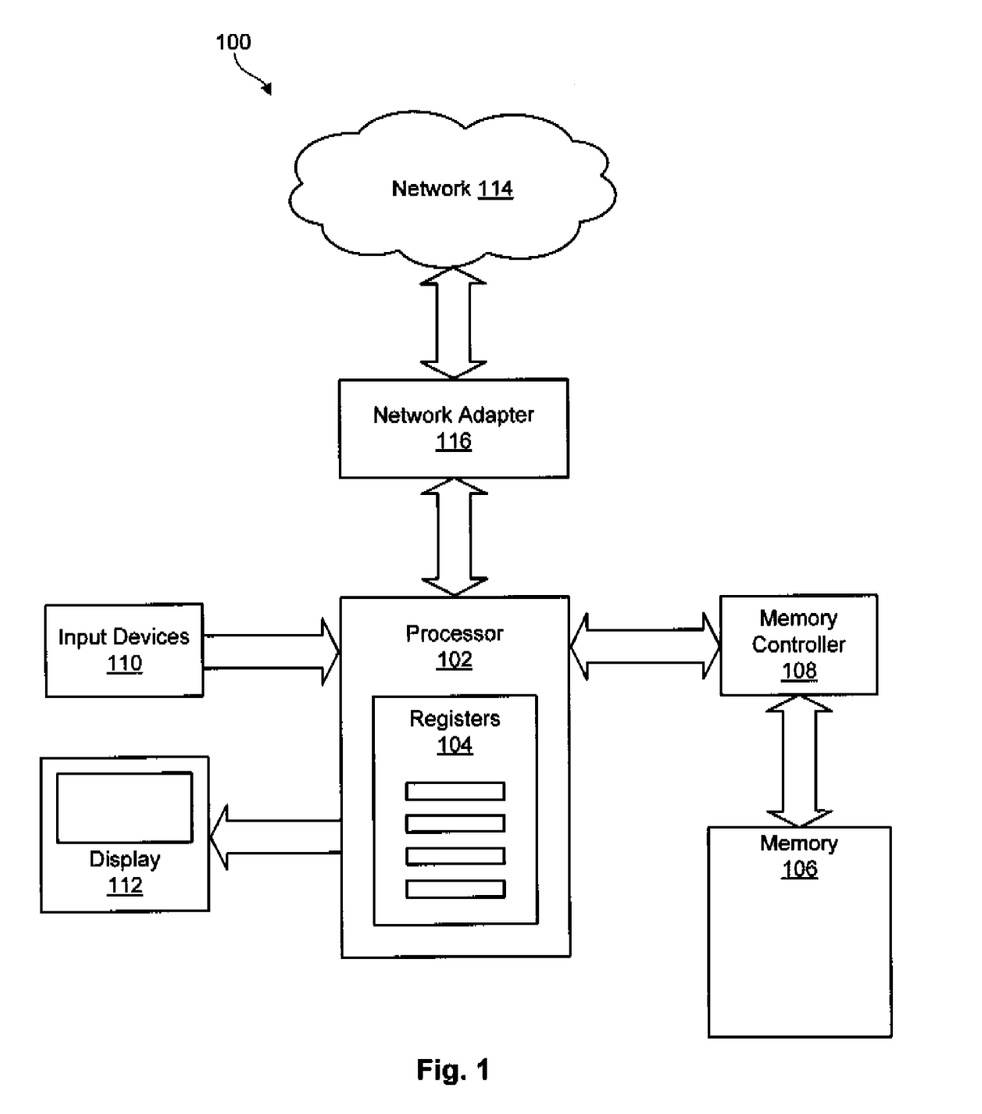
FIG. 1 is a high-level block diagram showing one example of a computer system suitable for use with various embodiments of the disclosure.

Referring to FIG. 1, one example of a computer system 100 is illustrated. The computer system 100 is presented to show one example of an environment where an apparatus and method in accordance with the disclosure may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a local-area network (LAN), wide-area network (WAN), or the Internet. Communication over the network 114 may be facilitated by a network adapter 116.

Figure 2:
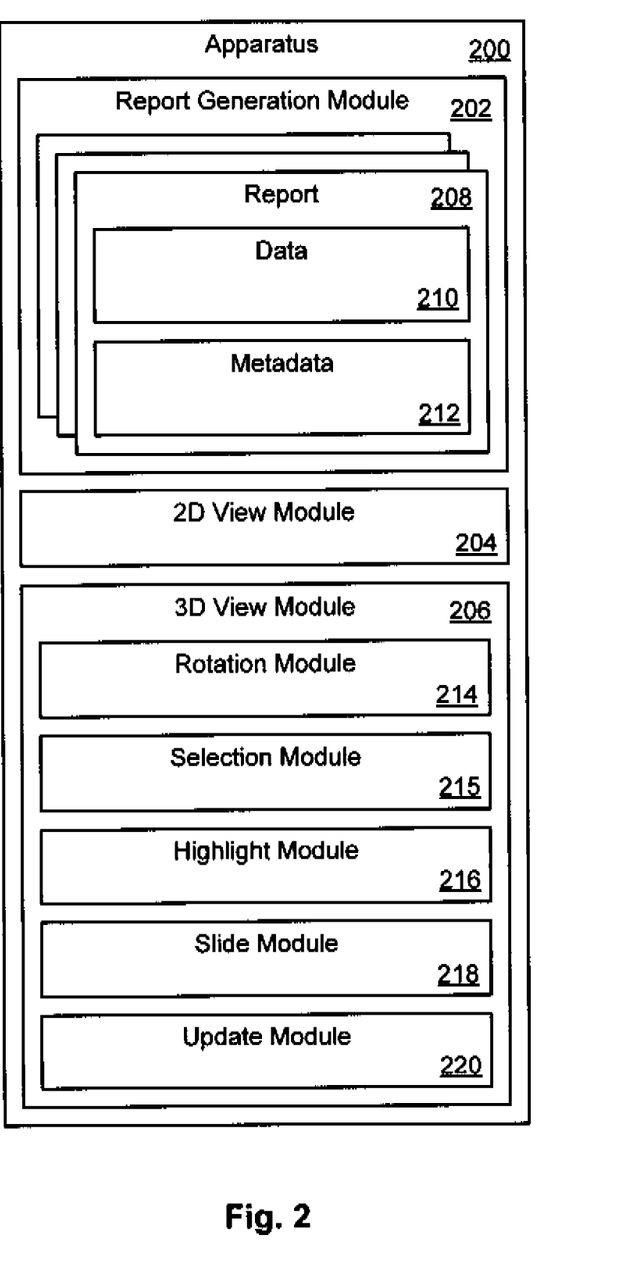
FIG. 2 shows one embodiment of an apparatus containing various modules for implementing various features of the disclosure.

Referring to FIG. 2, one embodiment of an apparatus 200 for providing a visualization of an age of data in a business analytics report is illustrated. As shown, the apparatus 200 includes one or more modules to provide various features and functions. These modules may be implemented in hardware, software or firmware executable on hardware, or a combination thereof. These modules are presented only by way of example and are not intended to be limiting. Indeed, alternative embodiments may include additional or fewer modules than those illustrated, or the modules may be organized differently. Furthermore, it should be recognized that, in some embodiments, the functionality of some modules may be broken into multiple modules or, conversely, the functionality of several modules may be combined into a single or fewer modules.

As shown in FIG. 2, in selected embodiments, the apparatus 200 includes one or more of a report generation module 202, a 2D (two-dimensional) view module 204, and a 3D (three-dimensional) view module 206. The report generation module 202 may be configured to generate business analytics reports 208 in one or more formats, such as lists, tables, crosstabs, dashboards, charts, graphs, or the like. One of skill in the art will recognize the myriad different forms a business analytics report 208 may take. Such reports 208 may display a mix of data 210 and metadata 212 describing the data 210. In certain embodiments, the data 210 is displayed in containers such as cells, areas, boxes, or the like, in the business analytics report 208. A datum 210 and its associated container may be referred to herein as a "data element."

A 2D view module 204 may be configured to display a business analytics report 208, including various data elements, in two dimensions. In certain embodiments, the two-dimensional view is the default view for a business analytics report 208. A 3D view module 206 may be configured to display a three-dimensional view (such as a three-dimensional isometric view) of the business analytics report 208. In this three-dimensional view, a time axis is added to the data elements of the business analytics report 208. As will be explained in more detail hereafter, the 3D view module 206 may be configured to display, on the time axis, update points identifying when data associated with particular data elements was updated.

Functionality may be provided to enable toggling between the two-dimensional and three-dimensional views of the business analytics report 208. For example, in one embodiment, a button may be provided on the two-dimensional view to transition to the three-dimensional view. Likewise, a separate button may be provided on the three-dimensional view to transition to the two-dimensional view. Such buttons may be clicked with a mouse pointer or other means. In other embodiments, a quick-key, key combination, or menu selection may be used to toggle between the two-dimensional and three-dimensional views. Other methods for toggling between the views may be used and are within the scope of the disclosure.

In certain embodiments, the 3D view module 206 contains various modules to provide different features and functions. For example, in certain embodiments, the 3D view module 206 includes one or more of a rotation module 214, selection module 215, highlight module 216, slide module 218, and update module 220.

The rotation module 214 may be configured to rotate the three-dimensional representation of the business analytics report 208 in a desired direction. In certain embodiments, the three-dimensional representation is rotated by simply clicking on the three-dimensional representation with a mouse pointer and rotating it in a desired direction by moving the mouse. In other embodiments, arrow keys or separate controls may be used to rotate the three-dimensional representation. Rotating the three-dimensional representation (which is rendered on a two-dimensional screen) may enable the user to more clearly view the update points and get a feel for where the update points are located in three-dimensional space. Other optional features, such as allowing zooming in or out on the three-dimensional representation, may also be provided.

A selection module 215 may enable selection of a particular data element or update point in the three-dimensional representation. This may be accomplished, for example, by clicking the data element or update point with a mouse pointer, scrolling through the data elements or update points and selecting a particular data element or update point with a key or key combination, mousing over a data element or update point, or the like. Optionally, in response to selecting a data element or update point, information related to the data element or update point may be displayed. For example, selecting an update point may cause the display of the date and/or time of the update point, a unique identifier associated with the update point, information identifying the corresponding data element, or the like. Similarly, selecting a data element may display the date and/or time the data element was last updated, a list of dates and/or times when the data element was updated, a unique identifier identifying the data element, or the like. Other information is also possible and within the scope of the disclosure.

In certain embodiments, a highlight module 216 is provided to show the correspondence between update points and data elements. For example, selecting an update point may cause the corresponding data element to become highlighted, showing the correspondence between the two. Similarly, selecting a data element may cause corresponding update point(s) to become highlighted. In certain embodiments, when a data element or update point becomes highlighted, information related to the data element or update point is displayed. For example, highlighting an update point may cause a timestamp or other related information to appear next to the highlighted update point. In other embodiments, the highlight module 216 uses color coding to show the correspondence between update points and data elements (e.g., yellow update points correspond to yellow data elements, red update points correspond to red data elements, etc.). Because it may be difficult to perceive the correspondence between update points and data elements in three-dimensional space on a two-dimensional screen or surface, the highlight module 216 provides an effective mechanism for showing correspondence therebetween.

In certain embodiments, a slide module 218 provides functionality to translate the business analytics report 208, either forward or backward in time, along the time axis. As the business analytics report 208 (which may be represented as a plane in three-dimensional space) crosses particular update points, an update module 220 updates data 210 in the data elements accordingly. This feature may be used to view data 210 in the business analytics report 208 at different points in time, as well as see how the data 210 has changed over time. This provides a user a historical view of the data 210, and may enable the user to make quick decisions based on how the data 210 has changed.

Once the business analytics report 208 is translated to a desired point in time, the business analytics report 208 may be switched to the two-dimensional view to show the updated data 210 in a more readable format. In certain embodiments, a timestamp may be updated on the report 208 to indicate when the data 210 in the report 208 was last updated or the report 208 was last modified.

Figure 3:
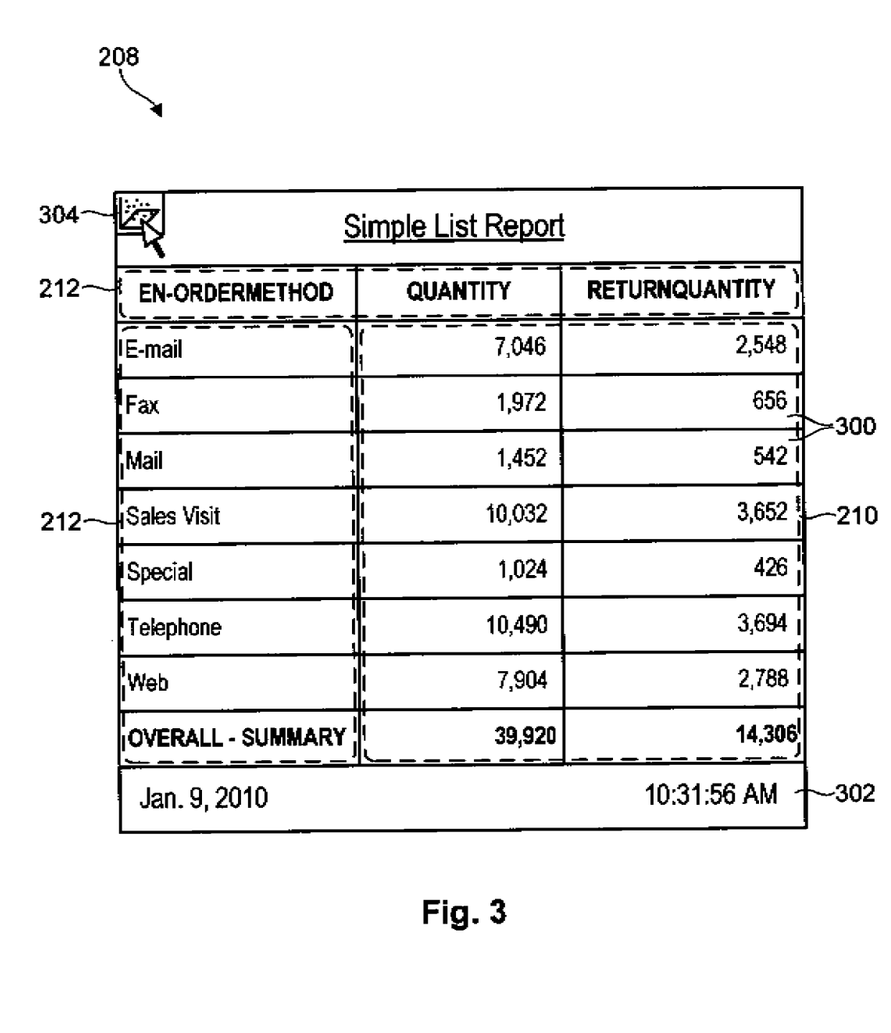
FIG. 3 shows an example of a two-dimensional business analytics report, in this example a list report, containing various data elements.

Referring to FIG. 3, one example of a two-dimensional business analytics report 208, in this example a list report 208, is illustrated to show possible operation of an apparatus 200 in accordance with the disclosure. In the illustrated example, the list report 208 shows a quantity of orders and returns for various order methods (e.g., email, fax, regular mail, etc.). As shown, the report 208 includes both data 210 and metadata 212 describing the data 210. The data 210 is displayed in various cells of the report. The data 210 and cells together form data elements 300.

In the illustrated example, the business analytics report 208 includes a timestamp 302. This timestamp 302 provides context to the user with respect to the age of the report 208. However, as previously mentioned, such timestamps 302 may be misleading since, although the report 208 may be relatively new, the data 210 in the report 208 or portions of the data 210 may be older than the timestamp 302. This can make a user think that he or she is working with data 210 that is fresher than it actually is. Such a situation can lead a user to make business decisions based on false assumptions.

Figure 4:
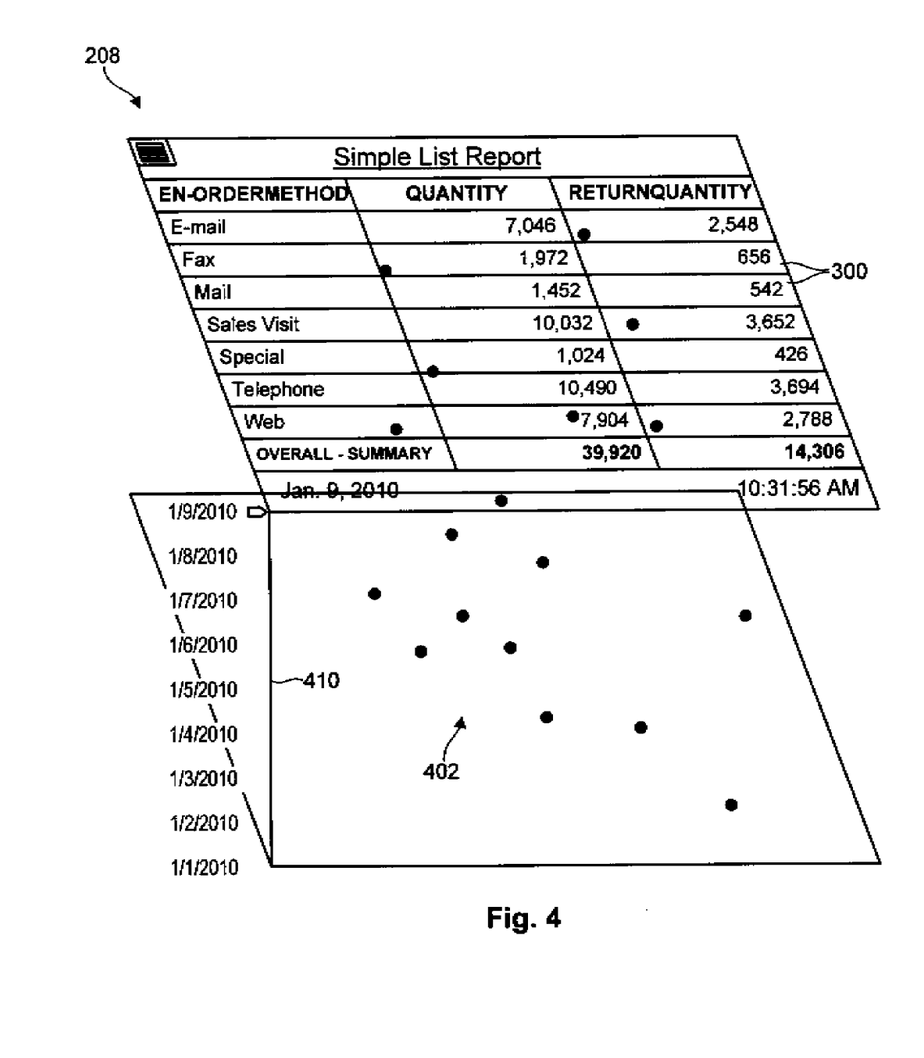
FIG. 4 shows an example three-dimensional view of the business analytics report of FIG. 3, wherein a time axis is added to the data elements.

As mentioned above in association with FIG. 2, functionality may be provided to enable toggling between two-dimensional and three-dimensional views of the business analytics report 208. In the illustrated embodiment, a button 304 is provided on the business analytics report 208 to transition to a three-dimensional view. Upon clicking the button 304, the 3D view module 206 displays the three-dimensional representation of the business analytics report 208. One example of a three-dimensional representation is illustrated in FIG. 4. As shown in FIG. 4, the 3D view module 206 displays, on a time axis 410, update points 402 identifying when data 210 associated with particular data elements 300 was updated. In certain embodiments, multiple update points 402 may displayed on the time axis 410 for the same data element 300, indicating different points in time when the data 210 was updated.

Once in the three-dimensional view, the rotation module 214 allows the business analytics report 208 to be rotated in three dimensions. In the illustrated example, the three-dimensional view is rotated by clicking on the three-dimensional view with a mouse pointer and moving the mouse pointer in a desired direction. Alternatively, or additionally, arrows keys or separate controls may be used to rotate the three-dimensional view. Rotating the three-dimensional view may enable the user to more clearly visualize locations of the update points 402 in three-dimensional space.

Figure 5:
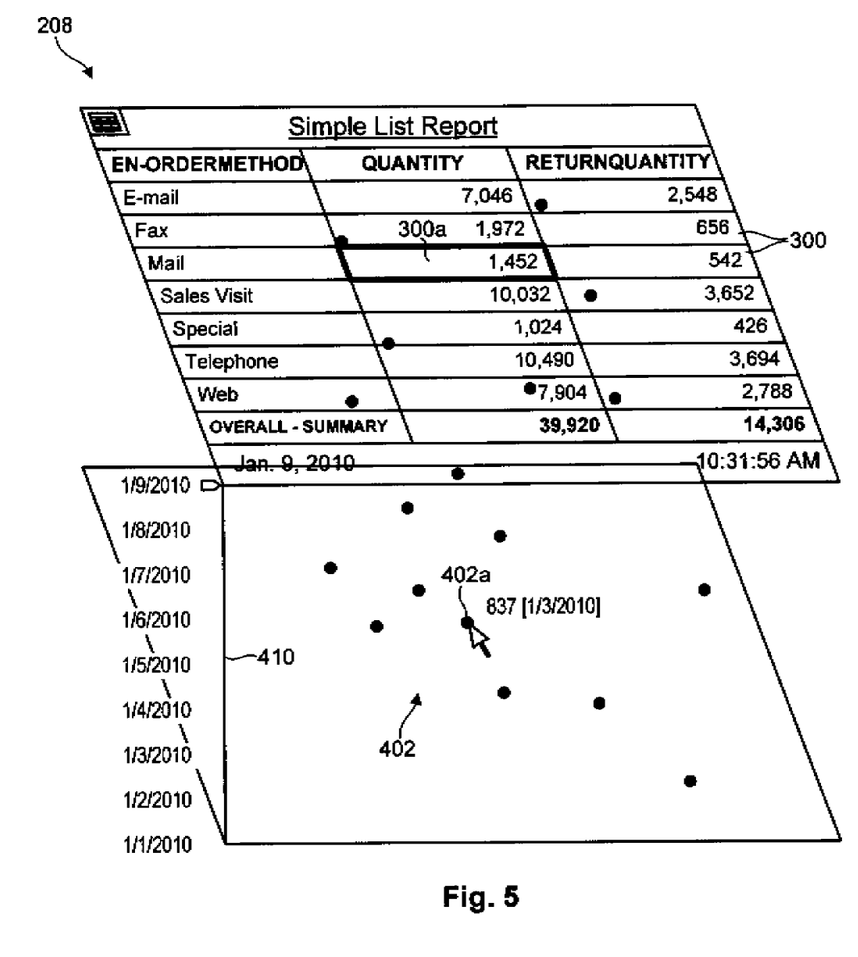
FIG. 5 shows one example technique for showing the correspondence between update points and data elements in a business analytics report.

Referring to FIG. 5, in the illustrated embodiment, the selection module 215 enables selection of a data element 300 or update point 402 by clicking on the data element 300 or update point 402 or mousing over the data element 300 or update point 402. As shown, upon selecting an update point 402a, information related to the update point 402a is displayed. In this example a unique identifier and timestamp associated with the update point 402a are displayed. As further illustrated, upon selecting the update point 402a, the highlight module 216 highlights the corresponding data element 300a to show the correspondence between the two. Similarly, selecting the data element 300a may also highlight the update point 402a (or update points, if there are several associated with the data element 300a). In this way, the highlight module 216 shows correspondence between update points 402 and data elements 300.

Figure 6:
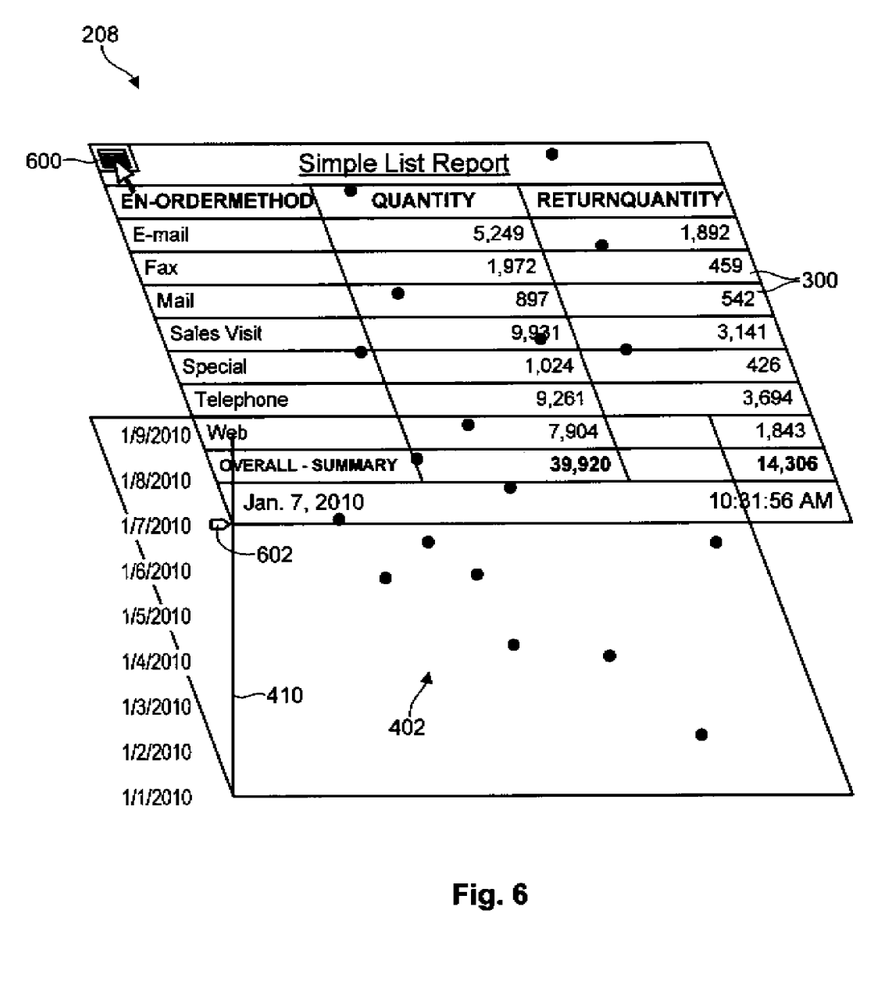
FIG. 6 shows one example technique for providing a user a historical view of data in a business analytics report.

Referring to FIG. 6, in the illustrated embodiment, a slide module 218 allows the business analytics report 208 to be translated along the time axis 410, either forward or backward in time. In certain embodiments, a pointer 602 or other indicator 602 is provided to indicate where the business analytics report 208 is located along the time axis 410. In certain embodiments, the business analytics report 208 is translated by dragging the pointer 602 along the time axis 410. In other embodiments, any part of the plane representing the report 208 could also be dragged.

As the business analytics report 208 crosses particular update points 402, the update module 220 updates the data 210 in the corresponding data elements 300. In certain embodiments, the time axis 410 is labeled with different dates and/or times to enable selection of a desired point in time. Although the selected point in time may not guarantee that all data 210 in the report 208 was up-to-date as of the selected point in time, it may at least indicate that all data 210 in the report 208 was updated at or prior to the selected point in time. In this way, a user may view how the report 208 would have looked at different points in time.

Figure 7:
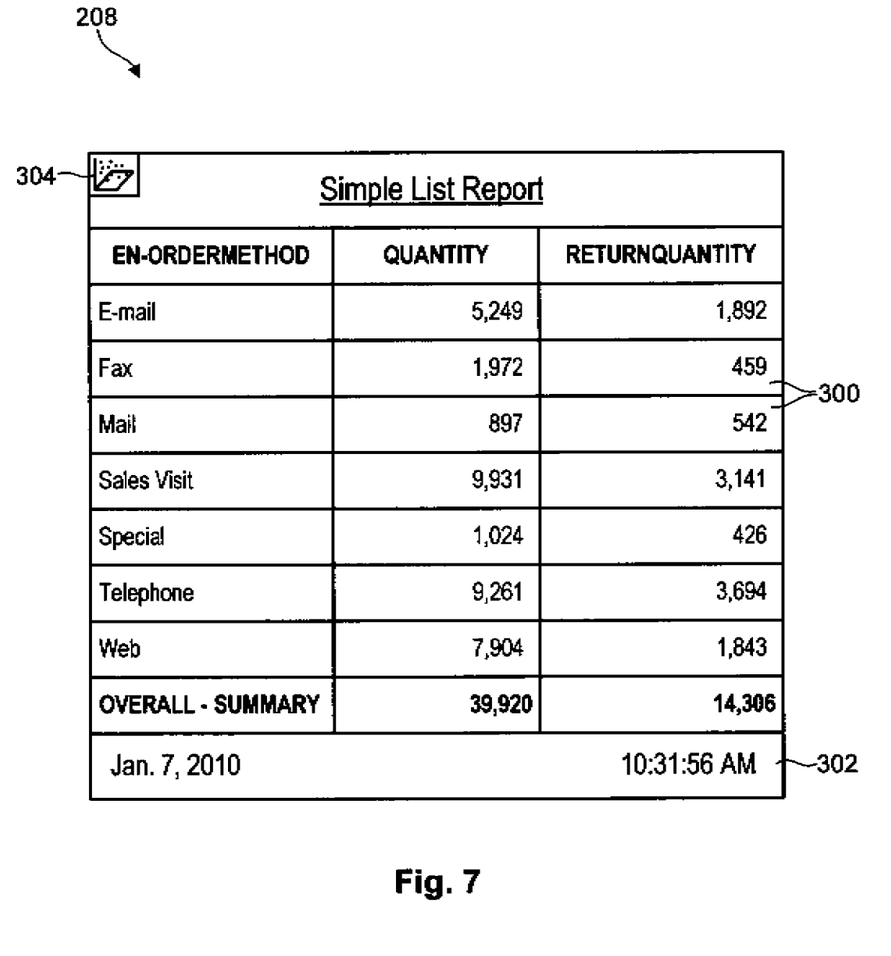
FIG. 7 shows an example two-dimensional business analytics report with modified data.

In the illustrated embodiment, a button 600 is provided to allow the three-dimensional view to be changed back to the two-dimensional view. Upon clicking this button 600, the business analytics report 208 is switched to the two-dimensional view and updated to include the data 210 at the selected point in time, as shown in FIG. 7. In certain embodiments, the timestamp 302 is updated on the report to indicate the selected point in time (as shown in FIG. 6). Alternatively, the timestamp 302 could be updated to reflect when the report was last updated.

It should be recognized that the apparatus and methods described above may be applied to a myriad of different reports 208. For example, the apparatus and methods may be applied to visualizations such as lists, charts, crosstabs, dashboards, tables, graphs, or the like. It should also be recognized that the apparatus and methods disclosed herein are not limited to visualizing the age of numerical data but may also be applied to other types of data elements, such as visual objects. For example, a time axis could be added to a pie chart to indicate when data associated with the pie pieces was updated. Update points could be provided for each pie piece. The pie chart could be moved along the time axis to change the data as well as the size of the corresponding pie pieces. In another example, a time axis could be added to a bar graph to indicate when data associated with the bars of the bar graph was updated. Update points could be provided for each bar in the bar graph. The bar graph could be moved along the time axis to change the data, as well as the size of the corresponding bars. Many other examples are possible and within the scope of the disclosure.

Figure 8:
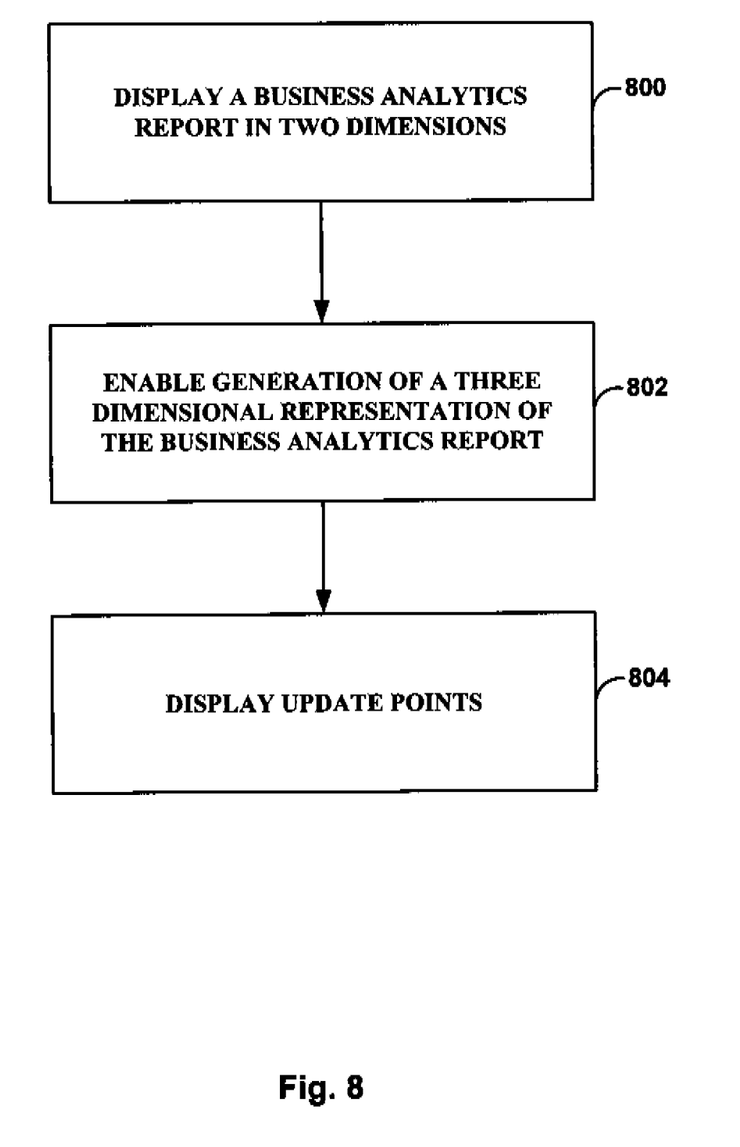
FIG. 8 shows a flow diagram illustrating one example of a method that may be implemented according to one or more embodiments of the disclosure.

FIG. 8 shows a flow diagram illustrating one example of a method that may be implemented according to one or more embodiments of the disclosure. As one non-limiting example, the method of FIG. 8 may comprise a method for providing a visualization of an age of data in a business analytics report, where the method is performed by one or more of the components of computer system 100 (FIG. 1) and/or one or more of the modules of apparatus 200 (FIG. 2).

As shown in FIG. 8, the example method includes displaying, in two dimensions (e.g., by 2D view module 204 shown in FIG. 2), a business analytics report comprising a plurality of data elements having data associated therewith (800). The method further includes enabling generation of a three-dimensional representation (e.g., by report generation module 202 and/or 3D view module 206 shown in FIG. 2) of the business analytics report by adding a time axis to the data elements of the business analytics report (802). The method further includes displaying (e.g., by 3D view module 206 shown in FIG. 2), on the time axis, update points identifying when the data associated with the data elements of the business analytics report was updated (804).

In one non-limiting example, report generation module 202 may enable generation of the three-dimensional representation of the business analytics report. In one non-limiting example, 3D view module 206 may enable generation of the three-dimensional representation of the business analytics report.

In some examples, the method of FIG. 8 may further include enabling sliding of the business analytics report along the time axis. Sliding the business analytics report across an update point may cause data associated with the corresponding data element to change to a different update time.

In some examples, the method of FIG. 8 may further include enabling rotation of the three-dimensional representation. In some examples, the method may further include highlighting a data element when an update point associated therewith is selected.

In some examples, the method of FIG. 8 may further include highlighting one or more of the update points upon one or more of the data elements associated therewith are selected. In some examples, the method may further include enabling sliding of the data elements individually along the time axis.

Different variations of the disclosed apparatus and methods are possible and within the scope of the disclosure. For example, in cases where a report 208 doesn't include individual data elements 300, update points may be provided for the report 208 as a whole. This allows the same type of visualization and control described above, except with reduced granularity. In other contemplated embodiments, the data elements 300 in a report 208 could be manipulated individually. For example, individual data elements could be moved individually along the time axis 410 to modify the date of the data 210 contained therein.

The flowcharts and block diagrams in the Figures illustrate the architecture, functionality, and operation of possible implementations of systems, methods, and computer-readable media according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for providing a visualization of an age of data in a business analytics report, the method comprising:
   displaying, in two dimensions, a business analytics report comprising a plurality of data elements having data associated therewith;
   enabling generation of a three-dimensional representation of the business analytics report by adding a time axis to the data elements of the business analytics report;
   displaying, in the three-dimensional representation and along the time axis, update points identifying when the data associated with the data elements of the business analytics report was updated, wherein the data elements correspond to the update points in the three-dimensional representation along the time axis such that the update points displayed in the three-dimensional representation enables a visualization of a respective age of the data associated with each data element of the business analytics report; and
   enabling translation of the business analytics report by moving a pointer along the time axis, wherein the pointer is provided to indicate where the business analytics report is located relative to the displayed update points in the three-dimensional representation along the time axis.

2. The method of claim 1, wherein translation of the business analytics report across an update point causes data associated with the corresponding data element to change to a different update time.

3. The method of claim 1, further comprising enabling rotation of the three-dimensional representation.

4. The method of claim 1, further comprising highlighting a data element when an update point associated therewith is selected.

5. The method of claim 1, further comprising highlighting one or more of the update points upon one or more of the data elements associated therewith are selected.

6. The method of claim 1, further comprising enabling sliding of the data elements individually along the time axis.

7. A computer program product to provide a visualization of an age of data in a business analytics report, the computer program product comprising a non-transitory computer-readable storage medium having computer-readable program code embodied therein, the computer-readable program code comprising:
   computer-readable program code to display, in two dimensions, a business analytics report comprising a plurality of data elements having data associated therewith;
   computer-readable program code to enable generation of a three-dimensional representation of the business analytics report by adding a time axis to the data elements of the business analytics report;
   computer-readable program code to display, in the three-dimensional representation and along the time axis, update points identifying when the data associated with the data elements of the business analytics report was updated, wherein the data elements correspond to the update points in the three-dimensional representation along the time axis such that the update points displayed in the three-dimensional representation enables a visualization of a respective age of the data associated with each data element of the business analytics report; and computer-readable program code to enable translation of the business analytics report by moving a pointer along the time axis, wherein the pointer is provided to indicate where the business analytics report is located relative to the displayed update points in the three-dimensional representation along the time axis.

8. The computer program product of claim 7, further comprising computer-readable program code to cause data associated with a data element to change when translating the business analytics report across a corresponding update point.

9. The computer program product of claim 7, further comprising computer-readable program code to enable rotation of the three-dimensional representation.

10. The computer program product of claim 7, further comprising computer-readable program code to highlight a data element when an update point associated therewith is selected.

11. The computer program product of claim 7, further comprising computer-readable program code to highlight one or more of the update points when one or more of the data elements associated therewith are selected.

12. The computer program product of claim 7, further comprising computer-readable program code to enable sliding of the data elements individually along the time axis.

13. An apparatus to provide a visualization of an age of data in a business analytics report, the apparatus comprising:
  one or more processors;
  a two-dimensional view module, executable by the one or more processors, to display, in two dimensions, a business analytics report comprising a plurality of data elements having data associated therewith;
  a module, executable by the one or more processors, to generate a three-dimensional representation of the business analytics report by adding a time axis to the data elements of the business analytics report;
  a three-dimensional view module, executable by the one or more processors, to display, in the three-dimensional representation and along the time axis, update points identifying when the data associated with the data elements of the business analytics report was updated, wherein the elements correspond to the update points in the three-dimensional representation along the time axis such that the update points displayed in the three-dimensional representation enables a visualization of a respective age of the data associated with each data element of the business analytics report; and
  a slide module, executable by the one or more processors, to enable translation of the business analytics report by moving a pointer along the time axis, wherein the pointer is provided to indicate where the business analytics report is located relative to the displayed update points in the three-dimensional representation along the time axis.

14. The apparatus of claim 13, further comprising an update module to cause data associated with a data element to change when the business analytics report is translated across a corresponding update point.

15. The apparatus of claim 13, further comprising a rotation module to enable rotation of the three-dimensional representation.

16. The apparatus of claim 13, further comprising a highlight module to highlight a data element when an update point associated therewith is selected.

17. The apparatus of claim 16, wherein the highlight module is further configured to highlight one or more of the update points when one or more of the data elements associated therewith is selected.

* * * * *